United States Patent
Fujita et al.

(10) Patent No.: US 6,340,244 B1
(45) Date of Patent: Jan. 22, 2002

(54) ROLLING BEARING FOR HARD DISK DRIVE

(75) Inventors: Yasunobu Fujita; Masao Yamamoto; Kouichi Hachiya; Atsushi Yokouchi; Toshikazu Yabe; Emiko Shiraishi; Michiharu Naka, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/090,921

(22) Filed: Jun. 5, 1998

(30) Foreign Application Priority Data

Jun. 6, 1997 (JP) .............................. 9-149403

(51) Int. Cl.[7] .............................. F16C 33/66

(52) U.S. Cl. .................. 384/462; 384/468; 384/470

(58) Field of Search ................ 384/468, 462, 384/470, 465, 474

(56) References Cited

U.S. PATENT DOCUMENTS

| | | | | |
|---|---|---|---|---|
| 4,527,661 A | * | 7/1985 | Johnstone et al. | 384/468 |
| 5,728,020 A | * | 3/1998 | Muranaka et al. | 384/462 |
| 5,918,986 A | * | 7/1999 | Matsui et al. | 384/470 |

* cited by examiner

*Primary Examiner*—Lenard A. Footland
(74) *Attorney, Agent, or Firm*—Sughrue Mion, PLLC

(57) ABSTRACT

A rolling bearing for an HDD being excellent in the resistance to fretting wear, capable of lowering the torque and relieving the torque change and having a long life while exerting no undesirable effect on various bearing properties. A rolling bearing for hard disk drives wherein a cage 7 supports a plural number of rolling elements 5 located between an inner ring 2 and an outer ring 4 and sealing members 6,6 fixed to the both ends in the axial direction of one of said inner ring 2 and said outer ring 4 are opposite to each other, wherein a lubricating oil has been injected into the bearing space formed between said sealing members 6,6 at the both ends in the axial direction so as to amount to 1 to 50% by volume of the bearing space.

13 Claims, 1 Drawing Sheet

ROLLING BEARING FOR HARD DISK DRIVE

BACKGROUND OF THE INVENTION

This invention relates to rolling bearings for hard disk drives (hereinafter referred to simply as HDD), in particular, rolling bearings appropriately employed in HDD components with rocking motion such as actuators (in particular, swing arms) or high-speed rotary motion such as spindles.

The present application is based on Japanese Patent Application No. Hei. 9-149403, which is incorporated herein by reference.

Although the computer industry has a short history compared with other industries, rapid technical innovation has been progressing in this field. Among all, HDDs undergo quick model changes and there have been developed novel ones for saving electricity, establishing quick response and high accuracy, downsizing, etc.

Under these circumstances, it has been required to improve the properties of bearings to be integrated into HDDs and prolonging the life thereof. For example, rolling bearings to be used in components with reciprocating rocking motion (for example, swing arm) should be highly resistant to fretting wear and have low torque and long life. Similarly, rolling bearings to be used in components with high-speed rotary motion (for example, spindle) should be excellent in heat resistance and high-speed rotary performance and have long life.

In a rolling bearing to be put into a swing arm, a spindle, etc. as shown in FIG. 1, for example, an inner ring 2 having the inner raceway surface 1 in its outer periphery and an outer ring 4 having the outer raceway surface 3 in its inner periphery are located concentrically and a plural number of balls 5,5 as rolling elements provided between the inner raceway surface 1 of the inner ring and the outer raceway surface 3 of the outer ring are supported by a cage 7 in such a manner as to allow free rolling. Circular sealing members 6,6 fixed to the both ends in the axial direction of the outer ring 4 prevent a grease lubricating oil (not shown in the figure), which has been injected into the bearing surface formed between the sealing members 6,6 from leakage. These sealing members also prevent the invasion of dusts suspending outside.

Although the grease lubrication is mainly employed for lubricating bearings, a rust proof lubricating oil is applied to the bearing raceway surfaces 1, 3, etc. prior to the injection of a grease in some cases. In the latter lubricating method, the initial lubrication is carried out by using not the grease but the lubricating oil so as to improve the lubricating performance.

Rotation is repeated at a minor rocking angle (usually 26° or below) in a swing arm rolling bearing. In the lubricating method with the use of a grease as described above, however, it is frequently observed that the lubricant masses are scraped out from the contact face, and also there is a possibility that the lubricant masses cause insufficient lubrication locally. This local insufficient lubrication induces fretting wear, thus shortening the life of the bearing. Moreover, the running torque at a minor angle is increased by the stirring resistance of the grease or the hang-up of the grease changes the torque. These phenomena lower the reliability of the HDD in reading and writing at high accuracy.

In a spindle bearing, use of a grease results in similar troubles such as an increase in running torque and changes in torque. In particular, the high-speed rotary performance is seriously affected thereby.

To solve these problems, attempts have been made to prevent the increase in torque and relieve the change therein by reducing the amount of the grease to be injected. When the grease is used only in an insufficient amount, however, there is a possibility that a fretting wear is arisen and the lubricating effect disappears earlier, which are not favorable from the viewpoint of the bearing life.

When the grease is injected in an increased amount, on the other hand, the increase and change in torque can be hardly regulated, though the fretting wear can be prevented and the bearing life can be prolonged thereby.

In the method wherein a rust proof lubricating oil is used together with a grease, the lubricating properties at the early stage can be particularly improved. However, this method essentially comprises injecting the grease. Therefore, the problems in association with grease cannot be fundamentally solved thereby.

In addition, it has been a practice to apply a rust proof lubricating oil onto a bearing by immersing the bearing in the rust proof lubricating oil. As a result, a large amount of the rust proof lubricating oil adheres to the outer periphery of the bearing, which does not directly participate in the lubricating effect, and makes it sticky and tacky. Before introducing into a HDD component (for example, swing arm unit or spindle motor), such a bearing should be cleansed by wiping, which brings about a decrease in the productivity and an increase in the production cost. Moreover, it is feared that the remaining lubricating oil might volatilize and stain recording media in the HDD.

As described above, there have been desired rolling bearings, which are components of HDDs aiming at saving electricity, establishing quick response and high accuracy, downsizing, etc., having high resistance to fretting wear, low torque, relieved torque change and long life. However, these requirements cannot be satisfied by using the existing grease lubricating method or the one with the combined use of a grease with a rust proof lubricating oil.

SUMMARY OF THE INVENTION

Accordingly, it is an object of the present invention to provide a rolling bearing for an HDD being excellent in the resistance to fretting wear, capable of lowering the torque and relieving the torque change and having a long life while exerting no undesirable effect on various bearing properties.

The above-mentioned object of the present invention can be achieved by a rolling bearing for hard disk drives wherein a cage supports a plural number of rolling elements located between an inner ring and an outer ring and sealing members fixed to the both ends in the axial direction of one of said inner ring and said outer ring are opposite to each other, characterized in that a lubricating oil has been injected into the bearing space formed between said sealing members at the both ends in the axial direction so as to amount to 1 to 50% by volume of the bearing space.

In the rolling bearing for HDDs of the present invention, films made of a lubricating oil are formed, as a substitute for the greases employed in the conventional cases, on the surface of the inner ring and outer ring raceway surfaces, rolling elements and cages to achieve lubricating effect. Such a surface coated with the lubricating oil film will be hereinafter called "lubricant face". Compared with greases, lubricating oils are highly flowable and free from any increase or change in torque as observed in the case with the use of greases. Thus, the rocking or high-rotary motion can be facilitated thereby. In addition, there arises no problem of the local insufficient lubrication due to the lubricant masses scraped out from the contact face of the inner ring and outer ring raceway surfaces and rolling elements, thus establishing a high resistance to fretting wear.

Since the lubricating oil is injected into the bearing space to as to amount to 1 to 50% by volume of the bearing space, the lubricating effect would not disappear early.

DETAILED DESCRIPTION OF THE INVENTION

Figure 1:
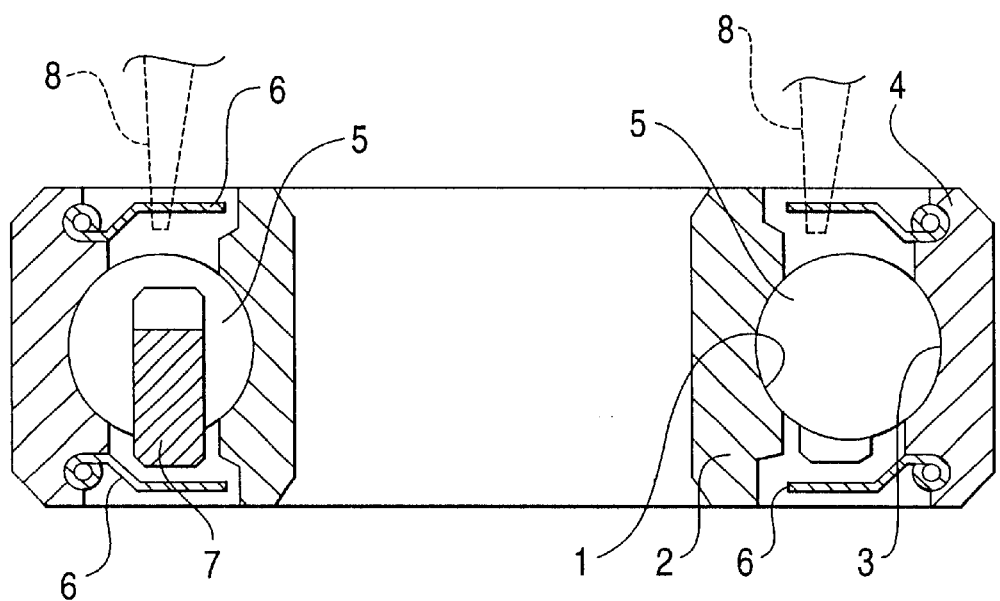
FIG. 1 is a sectional view of an example of a rolling bearing for HDDs.

Now, the rolling bearing for HDDs of the present invention will be described in detail.

The rolling bearing for HDDs of the present invention is characterized in that a lubricating oil is injected, as a substitute for the conventional greases, into the bearing space of a rolling bearing for HDDs as shown in FIG. 1. The bearing space between the sealing members 6,6 at the both ends in the axial direction means the space between the sealing members 6,6 at the both ends in the axial direction of the inner ring 2 or the outer ring 4. Thus, the space among the rolling balls 5 and the cage 7 is excluded therefrom.

It is preferable that the lubricating oil is injected into the bearing space so as to amount to 1 to 50% by volume of the space. When the content of the lubricating oil is less than 1% by volume, there arise some problems, for example, insufficient thickness of the lubricating oil film or early dry-up of the lubricating oil. When the lubricating oil is injected in an amount exceeding to 50% by volume, on the other hand, the lubricating oil frequently leaks out, though the lubricating life can be prolonged in this case.

It is desirable that the amount of the lubricating oil to be injected is appropriately determined within the range as defined above depending on the component into which the bearing is to be put.

In a rolling bearing employed in a high-speed rotary component such as a spindle, from among those to be put into HDDs, namely, it is preferable to inject the lubricating oil in a larger amount from the viewpoints of the heat resistance and high-speed rotary performance of the outer ring 4. In this case, it is preferable to inject the lubricating oil in a large amount up to 50% by volume. In a rolling bearing employed in a component with reciprocating rocking motion such as a swing arm, on the other hand, excessively high heat resistance and high-speed rotary performance are unnecessary. In this case, it is enough to inject the lubricating oil in an amount of 30% by volume or less, preferably from 4 to 25% by volume.

Although the method of injecting the lubricating oil is not particularly restricted, it is needed to utilize a method capable of controlling the amount of the injection. For example, the sealing member 6 is preliminarily put into the lower part of the bearing and then fixed to one end in the axial direction of the outer ring 4. Next, nozzles 8, in the same number as that of the pockets in the cage 7, are put downward thereon and the lubricating oil is uniformly injected from the nozzles in a predetermined amount into the bearing. Then the sealing member 6 is put in and fixed to another end of the outer ring 4.

By using this injection method, a large amount of the lubricating oil can be encapsulated in the position to be lubricated in the bearing, thus ensuring the formation of thick lubricating oil films, compared with the conventional method wherein a bearing is immersed in a lubricating oil. Further, the lubricating oil does not adhere to the outer surface of the bearing and, therefore, no procedure for wiping the lubricating oil is needed, different from the conventional method wherein a bearing is immersed in a lubricating oil. Thus the working efficiency can be highly elevated. Since the outside of the bearing is absolute dry, there is no fear that the lubricating oil might stain recording media in the HDD.

When the cage 7 preliminarily containing the lubricating oil is put into the bearing, the lubricating oil would ooze out onto the surface of the cage 7 as the bearing rotates. Thus the lubricating oil is continuously supplied to the lubricant face for a long time and thus the lubricating life is prolonged.

It is preferable to determine the content of the lubricating oil in the cage 7 depending on the component into which the bearing is to be put. The lubricating oil contained in the cage 7 is excluded from the lubricating oil to be injected into the bearing space. The lubricating life can be prolonged while the mechanical strength of the cage is lowered with an increase in the lubricating oil content in the cage 7. In the case of a rolling bearing to be used in a high-speed rotary component such as a spindle wherein mechanical strength of a certain degree is needed, it is therefore preferable to maintain the mechanical strength at the desired level by regulating the lubricating oil content. In such a case, it is preferable that the upper limit of the lubricating oil content is 40% by weight based on the weight of the cage 7. In the case of a rolling bearing to be used in a reciprocating rocking component such as a swing arm wherein the mechanical strength may not be so high, the lubricating oil content can be elevated so as to prolong the lubricating life. In such a case, the lubricating oil content may be up to 80% by weight, preferably from 10 to 70% by weight. In each case, the lower limit of the lubricating oil content is 0.1% by weight. When the lubricating oil content is less than 0.1% by weight, the lubricating oil is supplied from the cage 7 only in an excessively small amount and thus cannot contribute to the lubrication of the lubricant faces.

The lubricating oil may be introduced into the cage 7 by immersing the cage 7 in the lubricating oil, kneading a resin together with the lubricating oil followed by molding, etc. When the lubricating oil content is 3% by weight or less, it is convenient to immerse the cage 7 in the lubricating oil. When the lubricating oil is to be introduced thereinto in a larger amount, it is convenient to use the latter method. In this case, it should be taken into consideration that the capability of the resin, of which the cage 7 is made, of holding the lubricating oil varies depending on the type of the resin or the combination of the resin with the lubricating oil.

The sealing members 6,6 fixed to the both ends in the axial direction of the inner ring 2 may be opposite to the outer ring 4. Either a contact seal or a non-contact one may be used as the sealing members 6,6. The rolling elements may be rollers.

Although the lubricating oil is not particularly restricted, use of lubricating oils composed of the base oils with various additives as will be described hereinbelow makes it possible to obtain lubricant compositions being excellent in fretting wear resistance, heat resistance and high-speed rotary performance, thus achieving the object of the present invention.

When the lubricating properties and heat resistance and solubility of additives are taken into consideration, it is preferable that the base oil contain ester oils. Although the ester oils are not particularly restricted, preferable examples thereof include diester oils obtained by reacting a dibasic acid with a branched alcohol, aromatic ester oils obtained by reacting an aromatic acid basic acid with a branched alcohol and hindered ester oils obtained by reacting a polyhydric alcohol with a monobasic acid. From the viewpoint of low volatility for preventing recording media in HDDs from stains, it is preferable to use one selected from among aromatic ester oils, hindered ester oils and mixtures thereof.

Examples of the diester oils include dioctyl adipate (DOA), diisobutyl adipate (DIBA), dibutyl adipate (DBA), dioctyl azelate (DOZ), dibutyl sebacate (DBS), dioctyl sebacate (DOS) and methyl acetyl ricinoleate (MAR-N).

Examples of the aromatic ester oils include trimellitate, pyromellitiate, trioctyltrimellitate (TOTM), tridecyltrimellitate and tetraoctylpyromellitate.

Examples of the hindered ester oils include those obtained by reacting a polyhydric alcohol with a monobasic acid, each as will be shown hereinbelow. Either one or more monobasic acids may be reacted with a polyhydric alcohol. Also, use may be made of complex esters which are oligoesters of polyhydric alcohols with mixed fatty acids comprising dibasic acids with monobasic acids.

Examples of the polyhydric alcohols include trimethylolpropane (TMP), pentaerythritol (PE), dipentadrythritol (DPE), neopentyl glycol (NPG) and 2-methyl-2-propyl-1,3-propane (MPPD).

As the monobasic acids, monovalent $C_{4-18}$ fatty acids are mainly employed. Particular examples thereof include acetic acid, valerianic acid, caproic acid, caprylic acid, enanthic acid, pelargonic acid, undecanoic acid, lauric acid, caprylic acid, myristic acid, palmitic acid, beef tallow fatty acids, stearic acid, caproleic acid, undecylenic acid, linderic acid, tsuzuic acid, physeteric acid, myristoleic acid, palmitoleic acid, petroselinic acid, oleic acid, elaidic acid, asclepinic acid, vaccenic acid, sorbic acid, linolic acid, linolenic acid, sabinic acid and ricinoleic acid.

Such ester oil amounts at least to 20% by weight of the base oil. When the lubricating properties are taken into consideration, it is preferable that the ester oil contains at least 40% by weight of pentaerythritol ester, dipentaerythritol ester or a mixture thereof.

When the content of the ester oil is less than 20% by weight, no sufficient fretting wear resistance (lubricating properties) can be achieved. The upper limit thereof is not particularly determined.

In addition to the above-mentioned ester oil, the base oil may further contain synthetic hydrocarbon oils, ether oils and mineral oils.

Examples of the synthetic hydrocarbon oils include poly-α-olefin oils and α-olefin/ethylene cooligomers.

Examples of the ether oils include phenyl ether oils obtained by introducing $C_{12-20}$ (di)alkyl chains into diphenyl, triphenyl or tetraphenyl. From the viewpoint of low volatility, (di)alkyl polyphenyl ether oils are preferable. Based on the specification on the above ester oil, these oils are contained in an amount of not more than 80% by weight.

The base oil should have a kinematic viscosity of at least 30 mm²/s under a temperature of 40° C. When its kinematic viscosity is less than 30 mm²/s, sufficient film formation cannot be achieved during rotation and thus the bearing life is shortened. Although the upper limit of the kinematic viscosity is not particularly specified, the kinematic viscosity is to be not more than 400 mm²/s, by considering the handling properties, oil film formation and increase in torque. To form an oil film having a sufficient fretting wear resistance, it is preferable that the kinematic viscosity ranges from 40 to 200 mm²/s.

The durability of the lubricating oil film can be improved by adding rust proof agents, oily components, antioxidants, etc. thereto.

As the rust proof agents, it is preferable to use organic sulfonic acid metal salts or esters. Examples of the organic sulfonic acids include dinonylnapthalenesulfonic acid and heavy alkylbenzenesulfonic acids. Examples of metal salts thereof include calcium sulfonate, barium sulfonate and sodium sulfonate.

Examples of the sorbitan derivatives as esters include partial esters of polybasic carboxylic acids and polyhydric alcohols such as sorbitan monolaurate, sorbitan tristearate, sorbitan monooleate and sorbitan trioleate. Examples of the alkyl esters include polyoxyethylene laurate, polyoxyethylene oleate and polyoxyethylene stearate.

As the rust proof agent, use can be made of these organic sulfonic acid metal salts and esters either alone or as a mixture thereof.

Preferable examples of the oily components include higher fatty acids (oleic acid, stearic acid, etc.), higher alcohols (lauryl alcohol, oleyl alcohol, etc.), amines (stearylamine, cetylamine, etc.) and phosphates (tricresyl phosphate, etc.). These compounds may be employed either alone or as a mixture thereof.

As the antioxidants, it is preferable to use a mixture of a nitrogen-containing compound-based antioxidant with a phenol antioxidant or sulfur-based antioxidants.

Examples of the nitrogen-containing compound-based antioxidant include phenyl-α-naphthylamine, diphenylamine, phenylenediamine, oleylamidoamine and phenothiazine.

Examples of the phenol antioxidant include hindered phenols such as p-t-butyl phenyl salicylate, 2,6-di-t-butyl-p-phenylphenol, 2,2'-methylenebis(4-methyl-6-t-octylphenol), 4,4'-butylidenebis-6-t-butyl-m-cresol, tetrakis[methylene-3-(3'-5'-di-t-butyl-4'-hydroxyphenyl)propionate]methane, 1,3,5-trimethyl-2,4,6-tris(3,5-di-t-butyl-4-hydroxybenzyl)benzene, n-octadecyl-β-(4'-hydroxy-3',5'-di-t-butylphenyl)propionate, 2-n-octyl thio-4,6-di(4'-hydroxy-3',5'-di-t-butyl)phenoxy-1,3,5-triazine, 4,4'-thiobis-[6-t-butyl-m-cresol], 2-(2'-hydroxy-3'-t-butyl-5'-methylphenyl)-5-chlorobenzotriazole.

In addition to these components, the lubricating oil may contain extreme pressure agents, viscosity index elevating agents, wear inhibitors, etc. which may be well known ones.

To further illustrate the present invention in greater detail, the following Examples and Comparative Examples will be given.

EXAMPLES 1 TO 11 AND COMPARATIVE EXAMPLE 1

As Tables 1 to 3 show, definite additives (antioxidant, oily agent, etc.) were added to various base oils to thereby give lubricating oils. In these tables, each value given in brackets means the content (% by weight) of the component based on the whole lubricating oil. The additives were added so as to give a total content of 5% by weight based on the lubricating oil.

Then each lubricating oil was injected into the bearing space of a sample bearing [single row, deep groove ball bearing; non contact steel seal (model Z); No. SR1810, 7.94 mm (inner diameter)×12.7 mm (outer diameter)×3.97 mm (width)] to give the content (% by volume) specified in Tables 1 to 3. The lubricating oil was sealed by preliminarily putting a sealing member into the lower part of the bearing, injecting the lubricating oil in the definite amount, and then fixing the sealing member to one end. As the cage, use was made of one containing the same lubricating oil as the injected one in the amount as specified in Tables by immersion.

Each sample bearing thus formed was subjected to various tests as will be shown hereinbelow. Tables 1 to 3 also show the results of these tests.

(1) Rocking-tolerance Test

This test was performed under the following conditions to evaluate the fretting wear resistance and durability (life) of each bearing.

rocking frequency: 30 Hz outer ring rocking angle: 8° axial load: 29.4 N number of repeated rocking: 5,000,000 atmospheric temperature: ordinary.

The rocking resistance was evaluated in the following manner. After the completion of the rocking durability test, each test bearing was decomposed and the conditions of the inner ring, outer ring and cage were observed. Samples showing no wear in the inner ring raceway surface, outer ring raceway surface and cage were expressed in "○" and those showing running traces in the inner ring raceway surface and outer ring raceway surface were expressed in "Δ". These samples were referred to as coming up to the standard. On the other hand, those showing wear in the inner ring raceway surface and outer ring raceway surface were expressed as "x" and referred to as failing to come up to the standard.

(2) Oil Leakage Test

Each sample bearing containing the lubricating oil injected therein was allowed to stand at 25 for 30 days and it was confirmed under a stereo-microscope whether the oil leaked out or not. Samples showing no leakage were expressed in "○" while those showing leakage were expressed in "x".

(3) Dusting Test

In a sealed container, the outer ring of each sample bearing was rotated at 7,200 rpm and the dusts thus formed were counted with an out particle counter. Dusts of 0.1 μm or above in particle size per 0.1 cf (cubic foot) were counted. Samples showing 150 or less dusts were expressed in "○" and referred to as coming up to the standard. On the other hand, those showing more than 150 dusts were expressed as "x" and referred to as failing to come up to the standard.

(4) Torque Test

The inner ring of each sample bearing was rotated at 2 rpm under an axial load of 9.8 N. Then the torque required at the initial stage was measured and the change in the torque was monitored. Samples requiring an initial torque of not more than 1.0 gf.cm and showing a change in torque of 0.2 gf.cm or less were expressed in "○" and referred to as coming up to the standard. On the other hand, those exceeding these levels were expressed as "x" and referred to as failing to come up to the standard.

TABLE 1

|  | Example 1 | Example 2 | Example 3 | Example 4 |
|---|---|---|---|---|
| Base oil | ester oil [95] | ester oil [95] | ester oil [95] | ester oil [95] |
| Kinematic viscosity of base oil [mm$^2$/s 40° C.] | 32 | 32 | 32 | 32 |
| Amount of injected lubricant oil [vol %, based on bearing space) | 1 | 1 | 30 | 30 |
| Oil content in cage [wt. %] | 0.15 | 78 | 0.15 | 78 |
| Rocking resistance | Δ | Δ | ○ | ○ |
| Oil leakage | ○ | ○ | ○ | ○ |
| Dusting | ○ | ○ | ○ | ○ |
| Torque | ○ | ○ | ○ | ○ |

TABLE 2

|  | Example 5 | Example 6 | Example 7 | Example 8 |
|---|---|---|---|---|
| Base oil [95] | ester oil [95] | ester oil [95] | ester oil [95] | ester oil [95] |
| Kinematic viscosity of base oil [mm$^2$/s 40° C.] | 298 | 298 | 298 | 298 |
| Amount of injected lubricant oil [vol %, based on bearing space] | 1 | 30 | 1 | 30 |
| Oil content in cage [wt. %] | 0.15 | 0.15 | 78 | 78 |
| Rocking resistance | Δ | ○ | Δ | ○ |
| Oil leakage | ○ | ○ | ○ | ○ |
| Dusting | ○ | ○ | ○ | ○ |
| Torque | ○ | ○ | ○ | ○ |

TABLE 3

|  | Example 9 | Example 10 | Example 11 | C. Example 1 |
|---|---|---|---|---|
| Base oil | ester oil [95] PAO [15] | ester oil [90] ether oil [5] | ester oil [85] mineral oil [10] | Li grease |
| Kinematic viscosity of base oil [mm$^2$/s 40° C.] | 50 | 150 | 250 | 100 |
| Amount of injected lubricant oil [vol %, based on bearing space] | 10 | 30 | 20 | 10 |
| Oil content in cage [wt. %] | 15 | 30 | 20 | 10 |
| Rocking resistance | ○ | ○ | ○ | ○ |
| Oil leakage | ○ | ○ | ○ | ○ |
| Dusting | ○ | ○ | ○ | ○ |
| Torque | ○ | ○ | ○ | x |

As Tables 1 to 3 show, the test bearings of the examples of the present invention are each excellent in all of the items of rocking resistance, oil leakage, dusting and torque properties.

For comparison, the same tests were performed on a sample bearing having an Li grease lubricant injected into the bearing space to amount 10% by volume. As a result, this sample bearing achieved almost comparable results to those of the invention products in rocking resistance, oil leakage and dusting but inferior thereto in torque properties. This sample bearing is shown as Comparative Example 1 in Table 3.

EXAMPLES 12 TO 18 AND COMPARATIVE EXAMPLE 2

As Tables 4 and 5 show, definite additives (antioxidant, oily agent, etc.) were added to various base oils to thereby give lubricating oils. In these tables, each value given in brackets means the content (% by weight) of the component based on the whole lubricating oil.

Then each lubricating oil was injected into the bearing space of a sample bearing [single row, deep groove ball bearing; non contact rubber seal (model V); No. SR695, 5 mm (inner diameter)×13 mm (outer diameter)×4 mm (width)] to give the content (% by volume) specified in Tables 4 and 5. The lubricating oil was sealed by preliminarily putting a sealing member into the lower part of the bearing, injecting the lubricating oil in the definite amount, and then fixing the sealing member to one end. As the cage, use was made of one containing the same lubricating oil as the injected one in the amount as specified in Tables by immersion.

Each sample bearing thus formed was subjected to various tests as will be shown hereinbelow. Tables 1 to 3 also show the results of these tests.

(5) Bearing Sound Test

This test was performed under the following conditions to evaluate the high-speed rotary performance and durability (life) of each bearing.

bearing rotation rate: 12,000 rpm (outer ring)

axial load: 2 kgf atmospheric temperature: 90° C.

The sound was measured by using an Andelon meter. The Andelon value immediately after the injection of the lubricating oil (initial Andelon) was compared with the Andelon value after continuously operating for 2,000 hours. Table 4 shows the results. Samples showing a ratio of 2.5 or less were referred to as coming up to the standard.

☼: 0.5 or less

◉: 0.6–1.0

○: 1.1–2.5

Δ: 2.6–5.0 x: more than 5.1.

(6) Oil Leakage Test

Each sample bearing containing the lubricating oil injected therein was allowed to stand at 25° C. for 30 days and it was confirmed under a stereo-microscope whether the oil leaked out or not. Samples showing no leakage were expressed in "○" while those showing leakage were expressed in "x".

(3) Dusting Test

In a sealed container, the outer ring of each sample bearing was rotated at 7,200 rpm and the dusts thus formed were counted with an out particle counter. Dusts of 0.1 µm or above in particle size per 0.1 cf (cubic foot) were counted. Samples showing 150 or less dusts were expressed in "○" and referred to as coming up to the standard. On the other hand, those showing more than 150 dusts were expressed as "x" and referred to as failing to come up to the standard.

TABLE 4

| | Example 12 | Example 13 | Example 14 | Example 15 |
|---|---|---|---|---|
| Base oil | DOS [97.45] | DOS [97.45] | DOS [97.45] | PAO [85.95] |
| Additive | [2.55] | [2.55] | [2.55] | [14.05] |
| Kinematic viscosity of base oil [mm²/s 40° C.] | 12 | 12 | 12 | 48 |
| Amount of injected lubricant oil [vol %, based on bearing space] | 3 | 3 | 3 | 25 |
| Oil content in cage [wt. %] | 0.1 | 1.2 | 40 | 0.1 |
| Sound property | ○ | ◉ | ☼ | ○ |
| Oil leakage | ○ | ○ | ○ | ○ |
| Dusting | ○ | ○ | ○ | ○ |

TABLE 5

| | Example 16 | Example 17 | Example 18 | C. Example 2 |
|---|---|---|---|---|
| Base oil | DOS [18.09] PAO [72.36] | DOS [54.24] POE [36.16] | DOS [16.32] POE [10.88] PAO [63.25] | DOS [34.38] POE [51.57] |
| Additive | [9.55] | [9.6] | [9.55] | [14.05] |
| Kinematic viscosity of base oil [mm²/s 40° C.] | 100 | 70 | 150 | 70 |
| Amount of injected lubricant oil [vol %, based on bearing space] | 25 | 35 | 50 | 55 |
| Oil content in cage [wt. %] | 3 | 3 | 3 | 0.1 |
| Sound property | ☼ | ☼ | ☼ | ◉ |
| Oil leakage | ○ | ○ | ○ | x |
| Dusting | ○ | ○ | ○ | x |

As Tables 4 and 5 show, the test bearings of the examples of the present invention are each excellent in all of the items of sound property, oil leakage and dusting properties. In contrast thereto, the sample bearing of Comparative Example 2 achieved almost comparable results to those of the invention products in sound property, but inferior thereto in oil leakage and dusting properties, since the lubricating oil had been injected thereinto in an amount exceeding the level as defined in the present invention.

As discussed above, in the rolling bearing for HDDs of the present invention, films made of a lubricating oil are formed, as a substitute for the greases employed in the conventional cases, on the surface of the inner ring and outer ring raceway surfaces, rolling elements and cages to achieve lubricating effect. Compared with greases, lubricating oils are highly flowable and free from any increase or change in torque as observed in the case with the use of greases. Thus, the rocking or high-rotary motion can be facilitated thereby. In addition, there arises no problem of the local insufficient lubrication due to the lubricant masses scraped out from the contact face of the inner ring and outer ring raceway surfaces and rolling elements, thus establishing a high resistance to fretting wear. Since the lubricating oil is injected into the bearing space to as to amount to 1 to 50% by volume of the bearing space, the lubricating effect would not disappear early.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing for a hard disk drive comprising:
    an inner ring;
    an outer ring;
    a plural number of rolling elements located between said inner ring and said outer ring;
    a cage supporting said plural number of rolling elements;
    a pair of sealing members fixed to both ends in an axial direction of one of said inner ring and said outer ring and disposed opposite to each other; and
    a sole lubricant consisting of lubricating oil directly injected into a to-be-sealed bearing space defined between said sealing members at the both ends in the axial direction, wherein the amount of the lubricating oil is in a range of 1 to 50% by volume of the to-be-sealed bearing space, in which an amount of said lubricating oil is preliminarily contained in said cage, and the amount is in a range of 10–40% by weight of said cage.

2. The rolling bearing for a hard disk drive according to claim 1, in which the amount of said lubricating oil is not more than 30% by volume of the bearing space.

3. The rolling bearing for a hard disk drive according to claim 1, in which the amount of said lubricating oil is in a range of 4–25% by volume of the bearing space.

4. The rolling bearing for a hard disk drive according to claim 1, wherein a predetermined amount of said lubricating oil is injected into the to-be-sealed bearing space of the rolling bearing while said lubricant oil is prevented from adhering to an external portion of the rolling bearing.

5. A rolling bearing for a hard disk drive comprising:
    an inner ring;
    an outer ring;
    a plural number of rolling elements located between said inner ring and said outer ring;
    a cage supporting said plural number of rolling elements;
    a pair of sealing members fixed to both ends in an axial direction of one of said inner ring and said outer ring and disposed opposite to each other; and
    a sole lubricant comprising a lubricating oil directly injected into a to-be-sealed bearing space defined between said sealing members at the both ends in the axial direction, wherein the amount of the lubricating oil is in a range of 1 to 50% by volume of the to-be-sealed bearing space, in which an amount of said lubricating oil is preliminarily contained in said cage, and the amount is in a range of 10–40% by weight of said cage and wherein the kinematic viscosity of the sole lubricant is not more than 400 mm$^2$/s.

6. A hard disk drive spindle device comprising:
    a spindle device; and
    a rolling bearing for said spindle device, comprising:
        an inner ring;
        an outer ring;
        a plural number of rolling elements located between said inner ring and said outer ring;
        a cage supporting said plural number of rolling elements;
        a pair of sealing members fixed to both ends in an axial direction of one of said inner ring and said outer ring and disposed opposite to each other; and
        a sole lubricant consisting of lubricating oil directly injected into a to-be-sealed bearing space defined between said sealing members at the both ends in the axial direction, wherein the amount of the lubricating oil is in a range of 1 to 50% by volume of the to-be-sealed bearing space, in which an amount of said lubricating oil is preliminarily contained in said cage, and the amount is in a range of 10–40% by weight of said cage.

7. The hard disk drive spindle device according to claim 6, in which the amount of said lubricating oil is not more than 30% by volume of the bearing space.

8. The hard disk drive spindle device according to claim 6, in which the amount of said lubricating oil is in a range of 4–25% by volume of the bearing space.

9. The hard disk drive spindle device according to claim 6, wherein a predetermined amount of said lubricating oil is injected into the to-be-sealed bearing space of the rolling bearing while said lubricant oil is prevented from adhering to an external portion of the rolling bearing.

10. A rolling bearing for a hard disk drive comprising:
    an inner ring;
    an outer ring;
    a plural number of rolling elements located between said inner ring and said outer ring;
    a cage supporting said plural number of rolling elements;
    a pair of sealing members fixed to both ends in an axial direction of one of said inner ring and said outer ring and disposed opposite to each other; and
    a lubricating oil contained in a sealed bearing space defined between said sealing members at the both ends in the axial direction, wherein the amount of the lubricating oil is in a range of 1 to 50% by volume of the bearing space, in which an amount of said lubricating oil is preliminarily contained in said cage, and the amount is in a range of 10–40% by weight of said cage.

11. A rolling bearing for a hard disk drive comprising:
    an inner ring;
    an outer ring;
    a plural number of rolling elements located between said inner ring and said outer ring;
    a cage supporting said plural number of rolling elements;
    a pair of sealing members fixed to both ends in an axial direction of one of said inner ring and said outer ring and disposed opposite to each other; and
    a lubricating oil contained in a sealed bearing space defined between said sealing members at the both ends in the axial direction, wherein the amount of the lubricating oil is in a range of 1 to 50% by volume of the bearing space, in which and amount of said lubricating oil is preliminarily contained in said cage, and the amount is in a range of 10–40% by weight of said cage and wherein the kinematic viscosity of the lubricating oil is not more than 400 mm$^2$/s.

12. A hard disk drive spindle device comprising:
    a spindle device; and
    a rolling bearing for said spindle device, comprising:
        an inner ring;
        an outer ring;
        a plural number of rolling elements located between said inner ring and said outer ring;

a cage supporting said plural number of rolling elements;

a pair of sealing members fixed to both ends in an axial direction of one of said inner ring and said outer ring and disposed opposite to each other; and a lubricating oil confined to a sealed bearing space defined between said sealing members at the both ends in the axial direction, wherein the amount of the lubricating oil is in a range of 1 to 50% by volume of the bearing space, in which an amount of said lubricating oil is preliminarily contained in said cage, and the amount is in a range of 10–40% by weight of said cage.

13. A rolling bearing for a hard disk drive comprising:

an inner ring;

an outer ring;

a plural number of rolling elements located between said inner ring and said outer ring;

a cage supporting said plural number of rolling elements;

a pair of sealing members fixed to both ends in an axial direction of one of said inner ring and said outer ring and disposed opposite to each other; and a lubricating oil injected into a bearing space defined between said sealing members at the both ends in the axial direction, wherein the amount of the lubricating oil is in a range of 1 to 50% by volume of the bearing space, wherein said lubricating oil is preliminarily contained in said cage and an amount of said lubricating oil is preliminarily contained in said cage, and the amount is in a range of 10–40% by weight of said cage.

* * * * *